United States Patent [19]
Howard

[11] Patent Number: 5,338,016
[45] Date of Patent: Aug. 16, 1994

[54] PORTABLE TAILGATE-MOUNTED VISE

[76] Inventor: James J. Howard, 3629 Lakeview Dr., House Springs, Mo. 63051

[21] Appl. No.: 194,314

[22] Filed: Feb. 10, 1994

[51] Int. Cl.⁵ .................................................. B23Q 3/02
[52] U.S. Cl. ....................................... 269/97; 269/208
[58] Field of Search ............ 269/97, 98, 208, 147–149, 269/246, 250, 252

[56] References Cited

U.S. PATENT DOCUMENTS

| | | |
|---|---|---|
| 98,765 | 1/1870 | Farra . |
| 877,306 | 1/1908 | Dinsmoor . |
| 1,145,514 | 7/1915 | Schiek et al. . |
| 1,497,862 | 6/1924 | Lund ................................. 269/208 |
| 1,550,751 | 9/1925 | Sinkler . |
| 1,769,511 | 7/1930 | Heston et al. . |
| 2,073,030 | 3/1937 | Sefcik, Jr. . |
| 2,197,850 | 4/1940 | Bush . |
| 2,645,962 | 7/1953 | Zahner ................................. 269/98 |
| 2,778,393 | 1/1957 | Golasowski . |
| 2,846,908 | 8/1958 | Kelly . |
| 2,868,250 | 1/1959 | Holmboe ............................ 269/208 |
| 2,921,486 | 1/1960 | Burke . |
| 4,294,441 | 10/1981 | O'Banion et al. ...................... 269/97 |
| 5,092,426 | 3/1992 | Rhodes . |

Primary Examiner—Robert C. Watson
Attorney, Agent, or Firm—Paul M. Denk

[57] ABSTRACT

A portable, adjustable vise for mounting on a tailgate of a truck. The vise has an elongated hollow support beam. An adjustable slide extends out of a first end of the beam and can be varied to change the length of the vise. A brace is formed on the exposed end of the slide and disposed to seat in the gap between the truck bed and tailgate. A positioning tab extends outwardly from the brace to position the brace in the gap. A mounting assembly is attached to a second end of the beam. The mounting assembly has a transverse elongated brace with an adjustable L-shaped bracket at the first end and an adjustable L-shaped bracket at the second end. The respective brackets are designed to engage the edge of the tailgate. An adjustable but fixed jaw is attached to the beam or slide adjacent the first end. A movable jaw is slidingly attached to the beam, opposite the fixed jaw. A threaded nut assembly is mounted on the beam adjacent the second end. An elongated threaded adjusting screw extends through the nut assembly and engages the movable jaw.

6 Claims, 2 Drawing Sheets

PORTABLE TAILGATE-MOUNTED VISE

BACKGROUND OF THE INVENTION

This invention relates generally to vises, more particularly to a portable vise to be mounted on the tailgate of a pickup truck.

Vises for holding workpieces are known in the art. However, prior art vises are designed to bolt or otherwise attach to a workbench or work table. Such vises are not designed to mount to a movable machine, automobile, or truck for use in the field.

It would be advantageous, therefore, to have a portable vise that can be mounted on the tailgate of a truck, for example, so that the vise can be carried into the field, mounted, and used in an environment away from the work bench or work table.

One particular application for such a vise is to hold a chain saw in place while the chain is sharpened. Often the wood cutter drives a pickup truck into the woods to cut trees or firewood. When the chain is dull, the woodcutter must sharpen the chain. The saw chain is quite difficult to sharpen unless the bar of the saw is locked in a vise. It would be advantageous to have a portable, lightweight vise that can be mounted on the tailgate of the pickup truck to hold the chain saw during sharpening.

SUMMARY OF THE INVENTION

It is, therefore, a principal object of the present invention to provide a portable vise that can be mounted on the tailgate of a pickup truck.

It is a primary object of the present invention to provide a portable vise that can be mounted onto the tailgate of a pickup truck, and as installed, provide a means for fastening and clamping a variety of items to the vise, at such location, upon which work may be performed. For example, such a vise could be used for holding tools, members to be worked upon, wood to be cut or sawed, or an infinite variety of items that need to be clamped in place, in preparation for their working.

It is another object of the present invention to provide a portable vise for mounting on the tailgate of a pickup truck that has adjustable mounting hardware to allow the vise to be mounted on any size tailgate.

Another object of the invention is to provide a portable device to be mounted on the tailgate of a pickup truck that can hold a power tool, such as a chain saw while the chain is being sharpened.

Still another object of the present invention is to provide a portable vise that can be mounted on the tailgate of a pickup truck that is lightweight, strong, simple and economical to manufacture, and well suited for its intended purposes.

Briefly stated, a portable, adjustable vise for mounting on a tailgate of a pickup truck is provided having an adjustable mounting hardware to accommodate mounting on any size pickup truck tailgate. The vise has an elongated beam. An adjustable slide extends out of a first end of the beam to adjust the length of the vise. There is a transverse brace on the exposed end of the slide. The transverse brace is designed to fit between the tailgate and the bed of the truck. A positioning tab extends outwardly from the transverse brace to rest upon the tailgate of the truck. A mounting assembly is attached to the second end of beam. The mounting assembly has an elongated, transverse brace with a first L-shaped bracket at one end and a second L-shaped bracket at the second end of the transverse brace. The respective L-shaped brackets are designed to engage the edges of the tailgate. An adjustable fixed jaw is attached to the beam adjacent the first end of the beam. A movable jaw is slidingly attached to the beam, opposite the fixed jaw. A threaded nut assembly is mounted adjacent the second end of the beam. An elongated threaded adjusting screw extends through the nut assembly with a first end is attached to the movable jaw. A handle is attached to the second end of the adjusting screw. Rotation of the adjusting screw by the handle will drive the movable jaw toward or away from the fixed jaw.

DESCRIPTION OF THE PREFERRED EMBODIMENT

Figure 1:
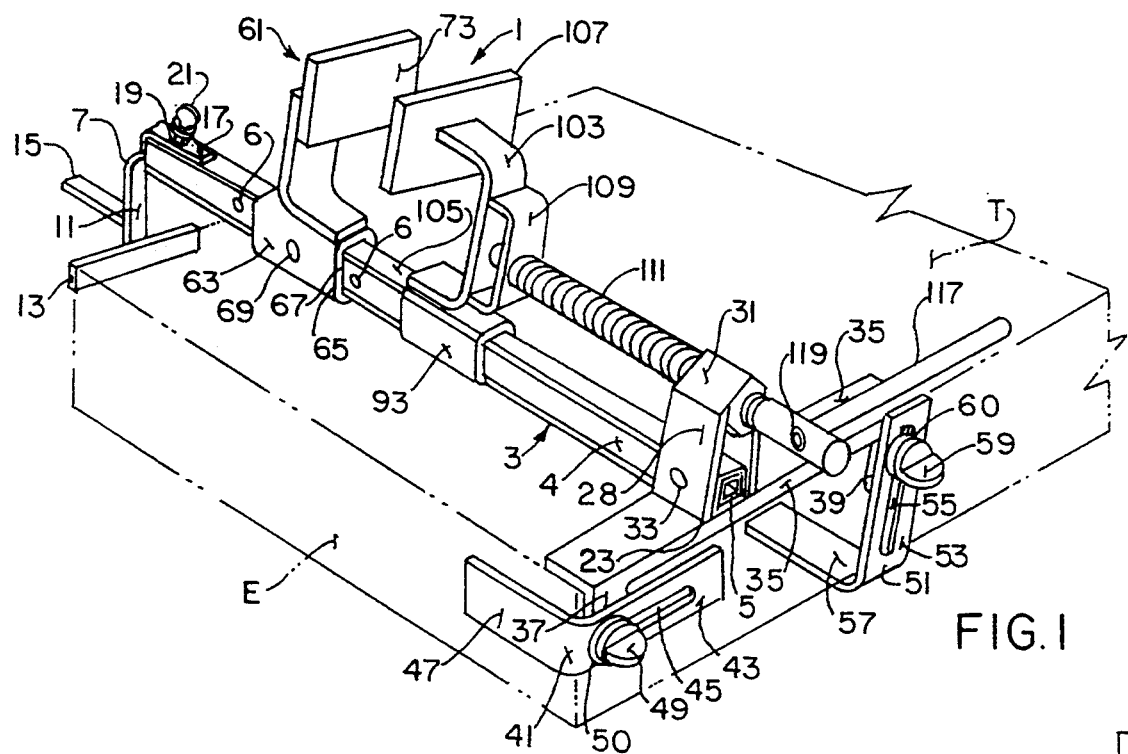
FIG. 1 is a perspective view of a portable tailgate-mounted vise of the present invention, shown mounted to a section of tailgate to demonstrate environment.

The tailgate mounted vise of the present invention as indicated generally by reference numeral 1 in FIG. 1. Vise 1 is shown mounted to a section of a pickup truck tailgate T. Vise 1 has an elongated, hollow support beam 3. Beam 3 is constructed from a generally rectangular wall 4 defining a generally rectangular internal bore 5. Beam 3 is formed from light gauge steel or alloy or other appropriate metal. Wall 4 has a plurality of holes 6 formed therethrough proximate a first end of the beam.

An elongated slide seats within bore 5. Slide 7 has an elongated, flat body 9 and depending brace support 11. A transverse brace 13 is attached to the end of brace support 11. A horizontal support tab extends outwardly from brace support 11. Tab 15 is situated at a sufficient distance D above brace 13 so that brace 13 can be situated in a gap between the bed of a pickup truck and the tailgate allowing tab 15 to rest on the surface of the truck bed so as to correctly position brace 13 within the gap and to secure the vise as will be further explained below. Slide 7 can be slid in and out of bore 5 at the first end of beam 3 to adjust the over all length of vise 1.

A screw clip 17, having a generally J-shaped profile, is inserted into the first end of beam 3. Clip 17 is formed from spring steel and is held in place by friction. Clip 17 has an upstanding, internally threaded neck 19 formed thereon. A threaded thumb screw 21 is threadedly engaged in neck 19 and extends through a hole (not shown) in clip 17 and a hole (not shown) in wall 4 of beam 3 to a depth sufficient to abut slide 7. Thumb screw 21 can be loosened to allow slide 7 to move axially within bore 5 or tightened to bias against slide 7 and pin slide 7 in a desired position within bore 5.

Figures 5, 6:
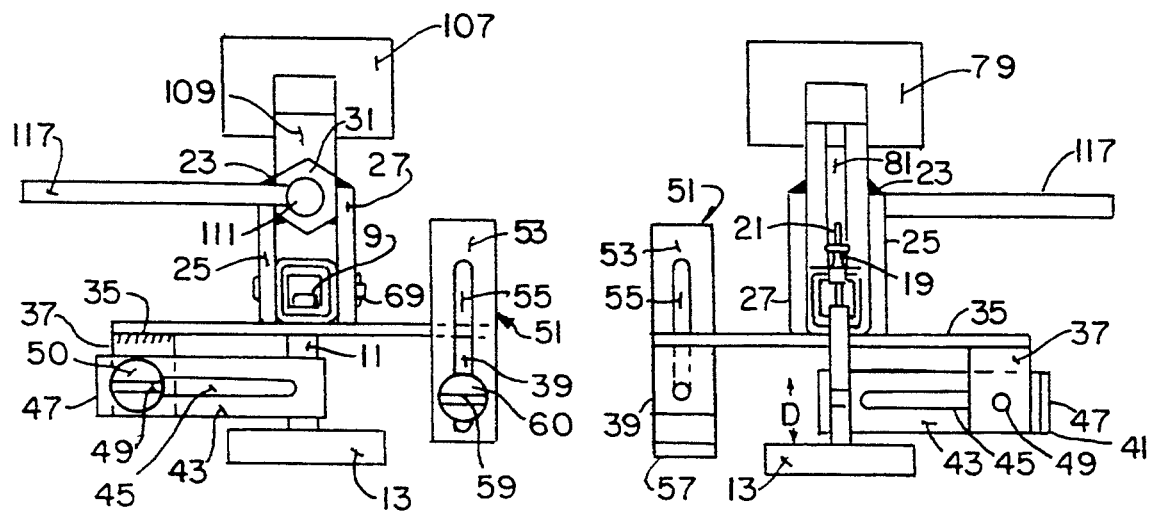
FIG. 5 is an end plan thereof.
FIG. 6 is an end plan thereof, showing the end opposite that shown in FIG. 5.
Figure 7:
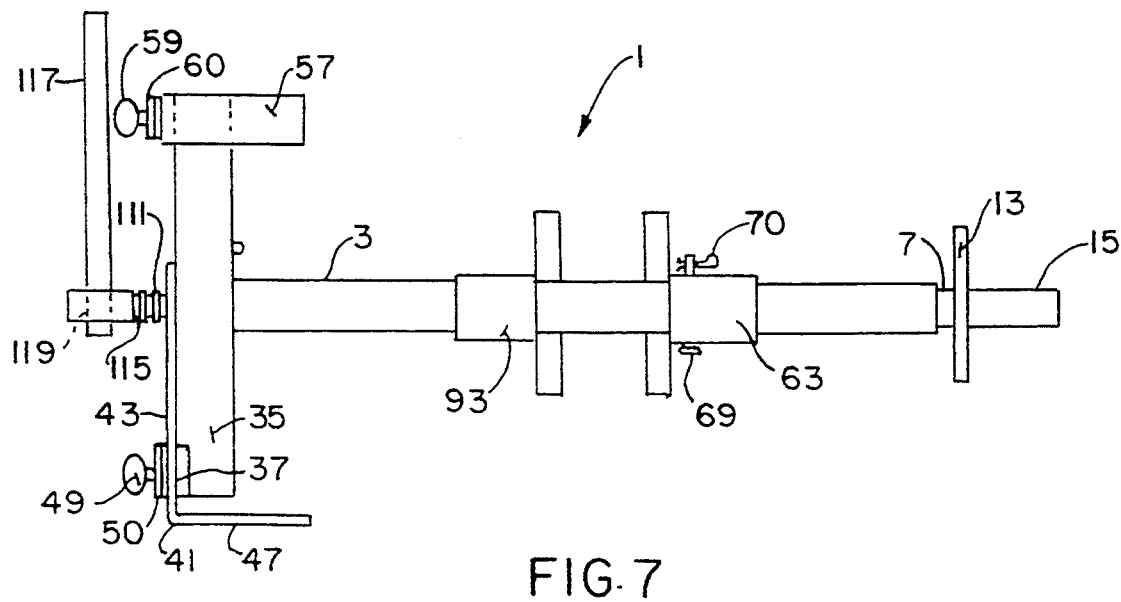
FIG. 7 is a bottom plan thereof.

A nut support frame 23 is attached to the opposite or second end of beam 3. Nut support frame 23 has two opposed vertical walls 25 and 27, as best illustrated in FIGS. 5 and 6. A threaded nut 31 is welded or otherwise appropriately attached between walls 25 and 27.

Threaded nut 31 has an internal threaded bore (not shown) formed therethrough for the engagement of an adjusting screw, as will be described in detail hereinafter. A pin 33 is inserted through holes (not shown) formed in the respective walls 25 and 27 and also through a hole (not shown) formed beam 3. Pin 33 has a cotter pin 34 inserted through one end.

Figure 2:
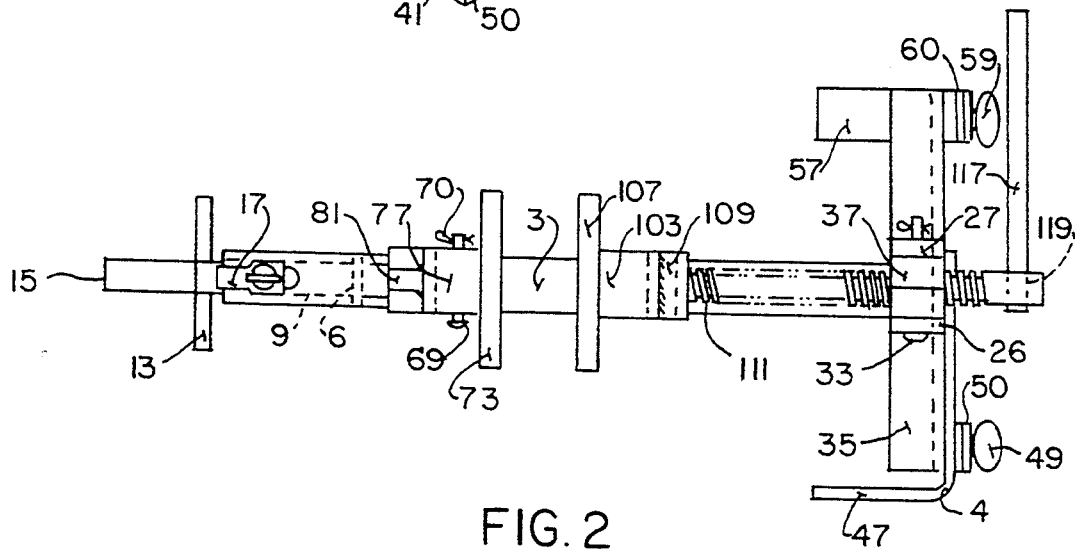
FIG. 2 is a top plan thereof.
Figure 3:
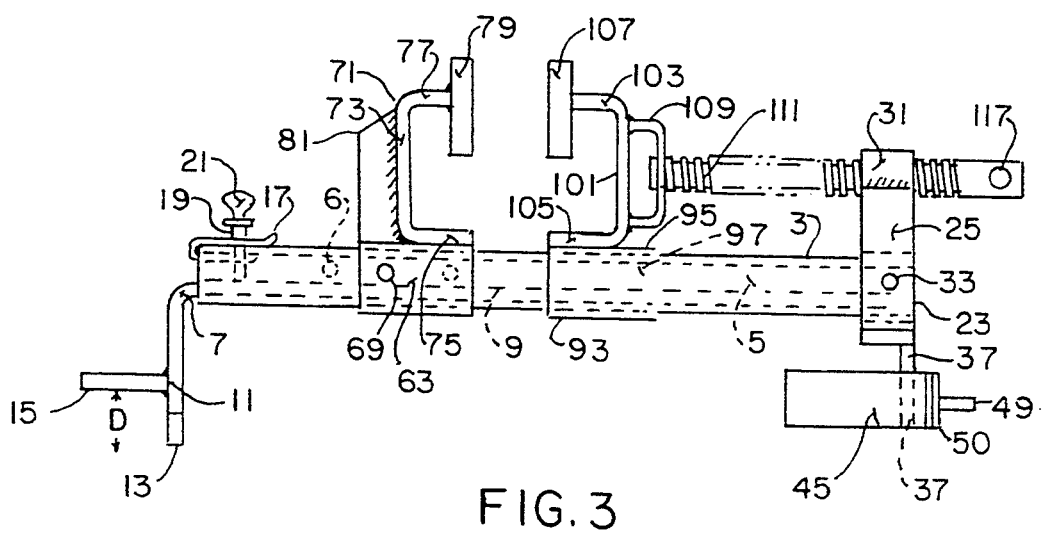
FIG. 3 is a side elevational view thereof.
Figure 4:
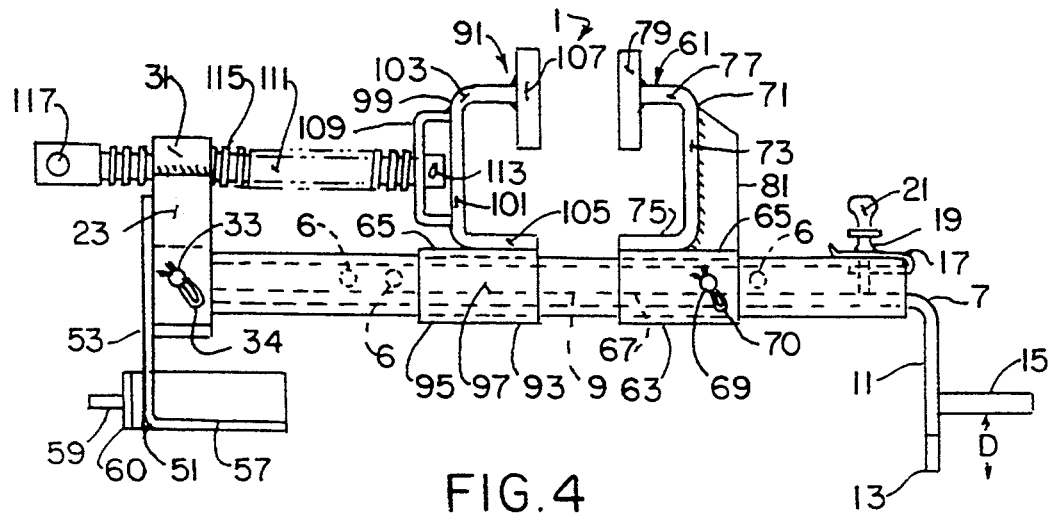
FIG. 4 is a side elevational view thereof, showing the side opposite that shown in FIG. 3.

A mounting assembly, as will now be described, is attached to the second end of the beam. The mounting assembly has a transverse, elongated mounting brace 35 is welded or otherwise appropriately attached to the bottom of bolt frame 23. Brace 35 has a first downwardly extending tab 37 at a first end and a second downwardly extending tab 39 at a second end. The respective tabs 37 and 39 have threaded holes (not shown) formed centrally therethrough. A first L-shaped bracket 41 is attached to tab 37. Bracket 41 has a flat first side 43, with an elongated slot 45 formed centrally therein, and a second flat side 47 perpendicular to side 43. A thumb screw 49 extends through spacers or washers 50 and slot 45 and engages the threaded hole formed in tab 37. As shown in FIGS. 1 and 2, bracket 41 can be rotated about thumb screw 49 so that flat side 45 abuts edge E of tailgate T. Alternatively, bracket 41 can be rotated about thumb screw 49 so that flat side 45 engages the underside of tailgate T. Moreover, since slot 45 is elongated, bracket 41 can be manipulated to move side 45 closer or further away from the tailgate to accommodate variations in the size and thickness of the tailgate.

A second L-shaped bracket 51 is attached to tab 39. Bracket 51 has a first flat side 53, having an elongated slot 55 formed centrally therein, and a second flat side 57 perpendicular to side 53. Threaded thumb screw 59 extends through washer 60, through slot 55 and engages threaded hole (not shown) formed in 39. As shown in FIG. 1, bracket 51 can be rotated about thumb screw 59 so that flat side 57 engages the underside of tailgate T. It should be noted that the respective brackets 41 and 51 can be reversed in position so that vise 1 can be mounted on an opposite corner of tailgate T. Since slot 55 is elongated; bracket 51 can be manipulated so as to accommodate variations in the thickness of tailgate T, as state above with reference to bracket 41.

A first or fixed jaw assembly 61 is attached to beam 3. Jaw assembly 61 has a mounting sleeve 63 with a generally rectangular wall 65 defining a generally rectangular bore 67. Bore 67 is slightly oversized relative to beam 3 so that sleeve 63 can be slid onto beam 3 and moved along beam 3. Wall 65 has holes (not shown) formed therein to accommodate the insertion of a mounting pin 69. Pin 69 extends through the hole (not shown) formed in sleeve 63 and through a hole 6 in beam 3. A cotter pin 70 is inserted through an end of pin 69. It should be noted that sleeve 63 may be positioned along beam 3 at an discrete position as long as the holes (not shown) in sleeve 63 align with a hole 6 formed in beam 3. A C-shaped upright 71 is welded to or appropriately attached to sleeve 63. Upright 71 has an vertical member 73 with upper arm 75 and opposed lower arm 77 extending perpendicular thereto. Jaw 79 is welded or otherwise appropriately attached to upper arm 75. A brace 81 extends from the back side of vertical member 73 to sleeve 63 to add additional strength and support to fixed jaw assembly 61. It should also be understood that, although jaw assembly 61 is considered a fixed jaw because it is secured in a fixed position on beam 3 by pin 69, it is possible to change the position of fixed jaw assembly 61 along beam 3 as previously described. Therefore jaw assembly 61 should be considered adjustable.

A second, or movable jaw assembly 91 is slidingly attached to beam 3, opposite jaw assembly 61. Jaw assembly 91 has a sleeve 93 formed from a generally rectangular wall 95 which defines a generally rectangular inner bore 97. Bore 97 is sufficiently oversized relative to beam 3 so that sleeve 93 can be slipped on beam 3 and moved relative thereto. Jaw assembly 91 has a C-shaped upright 91 having a vertical member 101 with an upper arm 103 and an opposed lower arm 105 perpendicular to vertical member 101. A jaw 107 is welded or otherwise appropriately attached to upper arm 103 and is positioned directly opposite jaw 79. A C-shaped brace 109 with a hole (not shown) formed centrally therein is welded or otherwise appropriately attached to the backside of vertical member 101.

An elongated adjusting screw 111 extends through nut 31 and engages the hole (not shown) in brace 109. Adjusting screw 111 is secured to brace 109 by a cotter pin 113 inserted through a hole (not shown) the end of adjusting screw 111, or by other appropriate attachment means that allows screw 111 to rotate. Adjusting screw 111 has a continuous helical tooth 115 formed thereon to engage the threads (not shown) formed within nut 31. A handle 117 is inserted in a hole 119 formed in the second or opposite end of adjusting screw 111.

In use, set screw 21 is loosened and slide 7 is withdrawn from bore 5 a sufficient distance to accommodate the size of the tailgate on which vise is to be mounted. Brace 13 is inserted in the gap between the tailgate and the bed of the pickup truck. Tab 15 rests on the bed of the pickup truck to correctly position brace 13 in the aforementioned gap. Brackets 41 and 51 are appropriately positioned under the edge E of the tailgate. One of the brackets may be positioned so as to engage the edge E of the tailgate, as shown in FIG. 1. The respective thumb screws 49 and 59 are tightened to hold the respective brackets 41 and 51 securely in place. Brace 13 of slide 7 is pushed snuggly against the back edge of the tailgate. Screw 21 is tightened pinning slide 7 in place within bore 5. Fixed jaw assembly 61 is appropriately positioned along beam 3 by withdrawing pin 69, moving sleeve 63 along the length of beam 3 until the holes in the sleeve are aligned with an appropriate hole 6. Pin 69 is inserted through the holes in sleeve 63, as well as through hole 6, and secured in place by cotter pin 73. The user grasps handle 117 and rotates it in either direction. Helical tooth 115 engages threads (not shown) within nut 33. Depending upon the direction handle 117 is turned, movable jaw assembly 91 will be urged toward fixed jaw assembly 61 or drawn away from fixed jaw assembly 61. A workpiece, such as a chain saw bar, can be positioned between the respective jaws 73 and 107. Handle 17 is rotated until jaw 107 pins the bar against jaw 73.

It will be obvious to those skilled in the art that various changes and modifications can be made in vise 1 of the present invention without departing from the scope of the claims. It should be understood. For example, that the various elements of vise 1 can be formed from steel or other appropriate metal in individual elements and appropriately joined together or cast as one piece without departing from the scope of the appended claims. Therefore, the foregoing description and accompanying drawings are intended to be illustrative only and should not be construed in a limiting sense.

What is claimed:

1. A portable vise for mounting on a tail gate of a pickup truck comprising:

an elongated hollow beam:

a slide slidably positioned within a first end of said beam;

a depending brace on an exposed end of said slide;

a transverse mounting brace attached to a second end of said beam;

at least one bracket attached to said transverse mounting brace for securement of said vise to the tailgate;

a threaded nut means extending upwardly proximate said second end of said beam and its brace;

a fixed jaw on one of said beam and slide;

a movable jaw on said beam opposite said fixed jaw; and an elongated adjusting screw threadily engaging said nut means, said screw engaging said movable jaw, said adjustable screw when adjusted providing for shifting of said movable jaw into an engaging or disengaging position.

2. The vise of claim 1 wherein said bracket including a first L-shaped bracket attached to a first end of said transverse brace; and a second L-shaped bracket attached to a second end of said transverse brace.

3. The invention of claim 1 and including a supporting tab extending outwardly from said depending brace.

4. The vise of claim 2 wherein said first and second L-shaped brackets are adjustable.

5. The vise of claim 1 wherein said fixed jaw is adjustable between positions along the length of one of said beam and slide.

6. The vise of claim 1 wherein said depending brace on said slide is disposed to fit to engage a gap between a tailgate on a truck and a bed of the truck.

* * * * *